United States Patent [19]

Sego

[11] Patent Number: 4,763,986
[45] Date of Patent: Aug. 16, 1988

[54] ILLUMINATED JEWELER'S LOUPE

[76] Inventor: Marvin A. Sego, 1616 Indiana Ave., Salt Lake City, Utah 84104

[21] Appl. No.: 934,391

[22] Filed: Nov. 24, 1986

[51] Int. Cl.⁴ ...................... G02B 27/02; G01N 21/00
[52] U.S. Cl. .................................. 350/235; 350/242; 350/250; 356/30
[58] Field of Search ........................ 350/235, 237–239, 350/242, 244, 245, 250; 362/35, 39–41, 365, 368, 377, 427, 280, 292, 293; 356/30, 31, 39

[56] References Cited

U.S. PATENT DOCUMENTS

| | | | |
|---|---|---|---|
| 889,352 | 6/1908 | Bold | 350/242 |
| 3,119,566 | 1/1964 | Close | 362/280 |
| 3,740,142 | 6/1973 | Takubo | 356/30 |
| 3,950,102 | 4/1976 | Eickhorst | 356/30 |
| 4,647,194 | 3/1987 | Shigetomi et al. | 356/30 |

Primary Examiner—John K. Corbin
Assistant Examiner—Loha Ben
Attorney, Agent, or Firm—B. Deon Criddle

[57] ABSTRACT

An illuminated loupe including a housing having top and bottom covers, a magnifying glass frame pivotally connected between the top and bottom covers and arranged to swing through the covers, a magnifying glass carried by the magnifying glass frame, a light bulb carried by the magnifying glass frame and arranged such that the light therefrom is directed into the frame, and beneath the magnifying glass carried by the frame.

2 Claims, 1 Drawing Sheet

ILLUMINATED JEWELER'S LOUPE

BACKGROUND OF THE INVENTION

1. Field of the Invention

The present invention pertains to jeweler's loupes that are commonly carried by and used by jewelers and the like, to examine precious gems.

2. Prior Art

Many different jeweler's loupes have been proposed in the past. Such devices have been made in various sizes, and in different configurations, to facilitate the convenient storing and use of the devices. Thus, it has been known to provide a jeweler's loupe with a housing into and out of which a magnifying glass frame, carrying a magnifying glass, is rotated. Other such devices have provided handles to be grasped by the user's fingers and magnifying glasses that are uncovered for use by a jeweler or the like.

It has long been recognized that it is desirable for such jeweler's loupes to be of a small configuration so that they can be easily carried, even in a pocket of a jeweler.

In using the previously known jeweler's loupes, it has been necessary to position a gem stone being examined such that the natural light falling thereon will provide for optimum viewing through the magnifying glass. It is not always possible to have the desired lighting available, and it may prove difficult to position the stone to receive the maximum lighting effect. In the absence of such maximum lighting it is possible that the jeweler will not be able to determine all of the characteristics of the precious gem being examined.

OBJECTS OF THE INVENTION

A principal object of the present invention is to provide a jeweler's loupe with a built-in lighting arrangement that will provide for maximum light distribution to a precious stone being examined through a magnifying glass.

Still other objects are to provide such illuminated jeweler's loupe that has a light arranged to automatically illuminate upon the movement of the magnifying glass and its supporting frame from a cover, the cover also serving as a handle for the device.

FEATURES OF THE INVENTION

Principal features of the invention include a housing having top and bottom covers, a magnifying glass frame pivotally connected between the top and bottom covers and arranged to swing through the covers, a magnifying glass carried by the magnifying glass frame, a light bulb carried by the magnifying glass frame and arranged such that the light therefrom is directed into the frame, and beneath the magnifying glass carried by the frame.

Still other features include the use of switch means operated by pivoting of the magnifying glass frame from the housing, to activate the light bulb and circuitry to maintain said light bulb activated until such time as the frame and the magnifying glass carried thereby is moved back toward the housing.

Other objects and features of the invention will become apparent from the following detailed description and drawing disclosing what is contemplated as being the best mode of the invention.

THE DRAWING

In the drawing:

FIG. 1 is a perspective view showing a preferred embodiment of the jeweler's loupe of the invention; and FIG. 2, a vertical section, taken on the line 2—2 of FIG. 1.

DETAILED DESCRIPTION OF THE INVENTION

Figure 1:
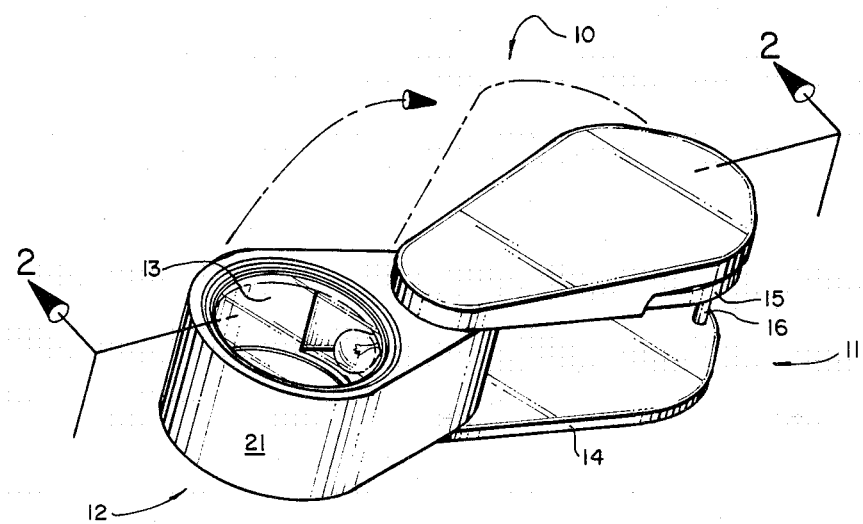
Figure 2:
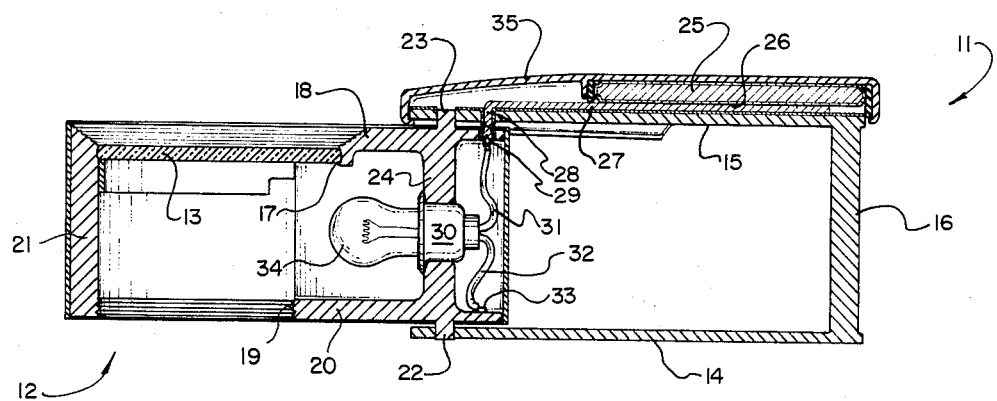

Referring now to the drawing:

In the illustrated preferred embodiment, the jeweler's loupe of the invention, shown generally at 10, includes a housing 11, a magnifying glass frame 12, and a magnifying glass 13.

The housing 11 includes a base plate 14 and a top plate 15, spaced from the base plate by a spacer post 16. The magnifying glass 13 is mounted in a seat 17 provided therefor in an upper wall 18 of the support frame 12. The magnifying glass 13 is positioned over an opening 19 in a bottom wall 20 of the support frame 12 and the side-wall 21 extends around the support frame and is shaped to conform to the outer edges of the base and upper plates 14 and 15 of housing 11, and to swing through the housing between the base and upper plates. Pins 22 and 23 project downwardly and upwardly, respectively, from a support plate 24 of the support frame and the pins extend into holes provided therefor in the base plate 14 and upper plate 15, respectively. A battery 25 has its positive face terminal 26 in contact with a conductor 27 that extends through the upper plate 15 to form a contact 28. Another contact 29 extends through the plate 18 of support 12 to the support frame 12. Connector 29 is attached to a light bulb holder 30 by a lead line 31 and the other lead line 32 of the light bulb holder is grounded at 33 to the support frame 12. A light bulb 34 is inserted into the bulb holder 30 and, as will be explained, will provide the illumination beneath the magnifying glass 13. A metallic cover 35 snaps over the battery 25 and provides means for grounding the opposite grounds terminal of the battery through the plate 15 to the frame 12.

In operation, a user pivots the frame 12 and magnifying glass 13 from the housing 11 and when the contact 29 engages contact 28 the light 34 is turned on. This illuminates the space beneath the magnifying glass 13 and any object, such as a precious gem placed in the opening beneath the lens so that a viewer can more readily observe all features of the gem.

Although a preferred embodiment of my invention has herein been disclosed, it is to be understood that the present disclosure is by way of example and that variations are possible without departing from the subject matter coming within the scope of the following claims, which subject matter I regard as my invention.

I claim:

1. An illuminated jeweler's loupe comprising
   a housing having top and bottom covers;
   a magnifying glass frame, said frame having an opening at a bottom wall thereof;
   means pivotally connecting the magnifying glass frame between the top and bottom covers whereby the frame swings into the housing between the covers;
   a magnifying glass having a top surface and a bottom surface carried by the magnifying glass frame, said glass being positioned over said opening;

a light bulb carried by the magnifying glass frame such that the light therefrom is directed into the frame at the bottom surface of the magnifying glass;

a battery carried by the housing; and means, including a switch, for electrically connecting the battery to the light bulb.

2. An illuminated jeweler's loupe comprising a housing having top and bottom covers;

a magnifying glass frame;

means pivotally connecting the magnifying glass frame between the top and bottom covers whereby the frame swings into the housing between the covers;

a magnifying glass having a top surface and a bottom surface carried by the magnifying glass frame;

a light bulb carried by the magnifying glass frame such that the light therefrom is directed into the frame at the bottom surface of the magnifying glass;

a battery carried by the housing; and means, including a switch, for electrically connecting the battery to the light bulb, said switch having a contact on the frame and a contact on the housing, said contacts being engaged when the frame is pivoted to a location extending outwardly from the frame and disengaged when the frame is pivoted into the housing.

* * * * *